United States Patent
Pujari

(10) Patent No.: US 10,235,132 B2
(45) Date of Patent: *Mar. 19, 2019

(54) INTERACTIVE VOICE RESPONSE INTERFACE FOR WEBPAGE NAVIGATION

(71) Applicant: PAYPAL, INC., San Jose, CA (US)

(72) Inventor: Vaibhav Pujari, Chennai (IN)

(73) Assignee: PAYPAL, INC., San Jose, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 15/071,057

(22) Filed: Mar. 15, 2016

(65) Prior Publication Data

US 2016/0196111 A1     Jul. 7, 2016

Related U.S. Application Data

(63) Continuation of application No. 14/200,559, filed on Mar. 7, 2014, now Pat. No. 9,288,321.

(51) Int. Cl.
| | |
|---|---|
| G06F 3/16 | (2006.01) |
| H04M 3/493 | (2006.01) |
| G06F 3/0481 | (2013.01) |
| G06F 3/0484 | (2013.01) |
| G06F 3/0489 | (2013.01) |
| G06F 17/22 | (2006.01) |
| H04L 29/08 | (2006.01) |

(52) U.S. Cl.
CPC ............ *G06F 3/167* (2013.01); *G06F 3/0481* (2013.01); *G06F 3/0484* (2013.01); *G06F 3/0489* (2013.01); *G06F 17/2247* (2013.01);

*H04L 67/025* (2013.01); *H04M 3/493* (2013.01); *H04M 3/4938* (2013.01); *H04M 2203/252* (2013.01)

(58) Field of Classification Search
USPC ..................... 704/277, 270.1, 270; 705/14.4, 705/14.49–14.73, 26.41, 27.1, 27.2, 301
See application file for complete search history.

(56) References Cited

U.S. PATENT DOCUMENTS

| | | | |
|---|---|---|---|
| 6,157,705 A | * | 12/2000 | Perrone ............. G06F 17/30663 379/88.01 |
| 8,036,347 B1 | | 10/2011 | Kanade |
| 8,185,517 B1 | | 5/2012 | Wood |
| 2005/0207545 A1 | | 9/2005 | Gao et al. |

(Continued)

*Primary Examiner* — Marcellus J Augustin
(74) *Attorney, Agent, or Firm* — Haynes and Boone, LLP

(57) ABSTRACT

There is provided systems and method for interactive voice response interface for webpage navigation. An existing webpage may be altered so that the webpage and corresponding forms offer Interactive Voice Response (IVR) to a user. A JavaScript library of other software component corresponding to the IVR interface may be downloaded to the user's system and/or browser when the user accesses the webpage. The webpage includes HTML tags corresponding to elements or a separate file/database may include links to the elements. The HTML tags and/or file/database correspond to an IVR flow of information. The JavaScript library is built to interpret the HTML tags and/or file/database so the IVR flow of information may be presented to the user. Thus, when a user engages the interactive mode, the JavaScript library may present the IVR flow to the user, interpret input from the user, and send the input to the underlying webpage.

20 Claims, 4 Drawing Sheets

(56) References Cited

U.S. PATENT DOCUMENTS

| | | | |
|---|---|---|---|
| 2009/0149158 A1* | 6/2009 | Goldfarb | H04L 65/4061 |
| | | | 455/414.1 |
| 2009/0161842 A1 | 6/2009 | Sylvain | |
| 2010/0088613 A1 | 4/2010 | DeLuca et al. | |
| 2012/0235921 A1* | 9/2012 | Laubach | G06F 3/0238 |
| | | | 345/172 |
| 2013/0132868 A1* | 5/2013 | Hackett | G06F 17/3089 |
| | | | 715/760 |
| 2014/0039885 A1 | 2/2014 | Reich et al. | |
| 2014/0365861 A1 | 12/2014 | Lasmarias et al. | |
| 2015/0149888 A1* | 5/2015 | Rice | G06F 17/30893 |
| | | | 715/234 |

* cited by examiner

INTERACTIVE VOICE RESPONSE INTERFACE FOR WEBPAGE NAVIGATION

CROSS-REFERENCE TO RELATED APPLICATIONS

This application is a continuation of U.S. patent application Ser. No. 14/200,559, filed Mar. 7, 2014, the entirety of which is incorporated herein by reference.

TECHNICAL FIELD

The present application generally relates to an interactive voice response interface for webpage navigation and more specifically to providing interactive voice response functionality to existing webpages so a user may navigate the webpage and complete webpage forms using the interactive voice response functions.

BACKGROUND

Websites utilize webpage forms that provide for data entry from users that may be retained and/or utilized by the website. In general, presentation logic controls the presentation of fields and content to a user, and is linked to business logic controlling how the data is displayed, changed, stored, and utilized. Thus, when a user interacts with overlying presentation logic on a webpage, the backend business logic processes the interactions and may store or utilize the resulting data for the website, databases, etc. Websites may be hosted by a single or set of networked servers that enable users to access and manipulate the website.

Interactive voice response (IVR) provides a technology allowing a user to interact with, such as receive and transmit data between, computer systems including networked servers. A server may also host the website, which may also be offered to the user as a data entry point. However, IVR systems are constructed separate from general presentation logic of webpage elements. For example, a separate system is constructed and tied to the backend business logic in an IVR system. The separate system governs the presentation of IVR messages and the receipt of keyboard and/or voice input. Thus, existing webpage content created for use and display to the user is not reused for the IVR system, and vice versa. Therefore, existing servers require construction of two separate systems in order to offer website and IVR functionality to users.

Figure 1:
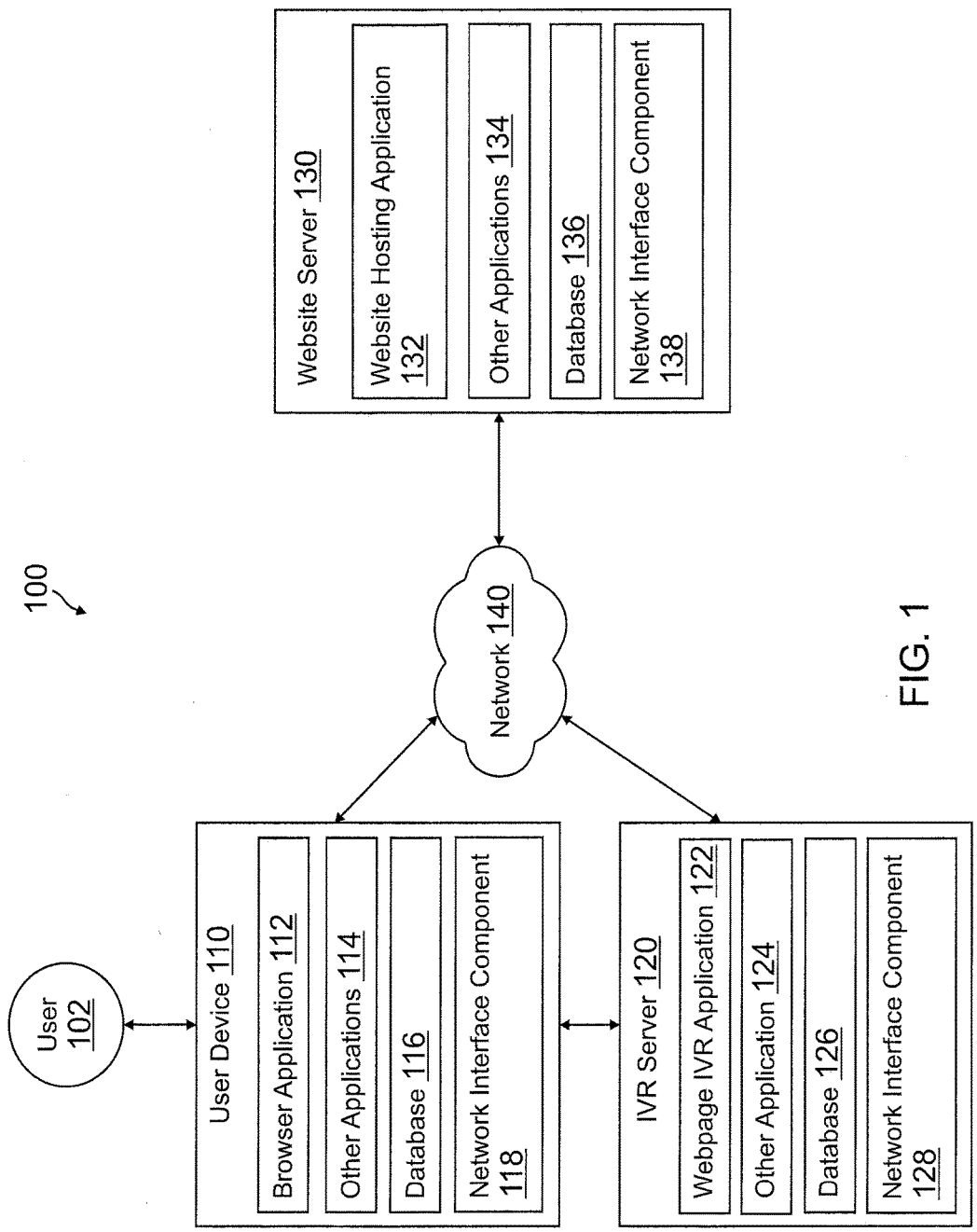
FIG. 1 is a block diagram of a networked system suitable for implementing the process described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

A networked server may include a website having individual webpages including webpage elements that may accept entries, changes, and other inputs from a user to store and/or process data from the inputs. The webpage may further offer an Interactive Voice Response (IVR) system interface for the webpage. The IVR interface may include a flow of webpage elements on the webpage, which are verbally and/or textually presented to the user. The IVR system may further accept inputs that correspond to the webpage elements so that the user may make selections and/or enter input on the webpage. The IVR system may accept vocal and/or textual inputs (e.g., a button or key selection or a voice command) for each webpage element. Thus, the user may enter information into the webpage using the IVR system.

The IVR interface may be constructed by defining custom HTML (or other webpage) tags for fields and/or elements on the webpage. Thus, the custom HTML tags may correspond to a flow of information in the IVR system interface and include sequencing numbers corresponding to the flow. In other embodiments, a separate file and/or database may maintain the IVR flow information with links the existing fields and/or elements on the webpage. Once the IVR flow information is defined, a JavaScript library may be constructed, where the JavaScript library interprets the IVR flow information. The JavaScript library may be included with the webpage so that the library is downloaded to the user's browser when the user accesses the webpage. Thus, the user may initiate the JavaScript library when the user visits the webpage and utilize the IVR interface. Where custom HTML tags are utilized, the software component library may process the underlying HTML document for the webpage. In other embodiments using a separate file or database, the software component library may process the file/database that includes links to the webpage and processes to interact with the webpage through user inputs.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, an IVR server 120, and a website server 130 in communication directly and/or over a network 140. IVR server 120 may establish an IVR flow for the webpage and define IVR flow information using either custom HTML tags on fields in the webpage or through a separate file/database which maintains IVR flow information as links to the fields in the webpage. Once IVR flow information is determined, a software component library may be generated that interprets the IVR flow information and loads voice messages corresponding to the fields from the IVR flow information. User 102 may utilize user device 110 to access a webpage of website server 130 and received the software component library. Thus, user 102 may hear the voice messages and input data/information to the webpage through the messages when user 102 initiates the software component library. Thus, user 102 may navigate webpages of website server 130 using the IVR interface provided by IVR server 120.

User device 110, IVR server 120, and website server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

User device 110 may be implemented using any appropriate hardware and software configured for wired and/or wireless communication with IVR server 120 and/or website server 130. For example, in one embodiment, user device 110 may be implemented as a personal computer (PC), a smart phone, personal digital assistant (PDA), laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may be utilized in the same manner and with the same features as described with respect to user device 110.

User device 110 of FIG. 1 contains a browser application 112, other applications 114, a database 116, and a network interface component 118. Browser application 112 and other applications 114 may correspond to processes, procedures, and/or applications executable by a hardware processor, for example, a software program. In other embodiments, user device 110 may include additional or different software as required.

Browser application 112 may be used, for example, to provide a convenient interface to permit a user to browse information available over network 140 including accessing webpages, entering information from webpages, and navigating websites through webpages. In certain embodiments, browser application 112 may be implemented as a web browser configured to view information available over the Internet or access a website of a website provider, such as website server 130. For example, browser application 112 may be utilized to access websites and engage in online actions with website server 130, including viewing information provided on the webpages, entering information to the webpages, and navigating through the website. Accessible websites may include financial websites to view financial information and engage in financial transactions, messaging websites, social networking websites, and/or other online sources. Additionally, browser application 112 may access other service providers that may provide services in association with websites, such as IVR server 120.

Browser application 112 may receive other information than displayable webpages from IVR server 120 and/or website server 130. For example, browser application 112 may be configured to receive an interactive voice response (IVR) like interface for webpages of website server 130. Browser application 112 may receive a software component library that may read IVR flow information for a website and present the IVR flow information to user 102 through voice messages, as will be explained in more detail herein.

IVR flow may correspond to a sequencing of webpage elements that include information presented on a webpage as well as fields of the webpage that may accept input and/or website navigation instructions (e.g., a clickable button that navigates to other webpages throughout a website). IVR flow information may be determined using the IVR flow and include HTML tags on webpage elements of a file/database with links to webpage elements, as will be discussed in more detail herein. Browser application may execute the software component library to interpret the IVR flow information and present and IVR like interface to user 102 using the IVR flow information. The IVR like interface may walk user 102 through the webpage elements, such as by playing a voice message for each webpage element that includes an input that may select, change, and/or navigate through the webpage element. For example, the IVR message for a first tab of a money transfer webpage that corresponds to transferring money to a recipient may include a message "Press ctrl-1 to transfer money," while the IVR message for a second tab of a money transfer webpage that corresponds to requesting a transfer of money from a sender may include "Press ctrl-2 to request money."

Browser application 112 may receive input for the fields in the form of text input using an attached device (e.g., keyboard, mouse, etc.). Additionally, input to the webpage may also be in the form of voice input by user 102 that may be converted to text and/or commands. For example, voice input may correspond to an amount of money or name of a person to enter a field that may be converted to text into the field. In other embodiments, the voice input may be a command to advance to a new webpage or revisit a previous webpage. Inputs entered by user 102 may also include identifiers and/or other data from database 116 that may be recalled using a voice command and/or keyboard shortcut/command (e.g., through a previous establishment of the identifier having a voice command to recall the identifier).

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 140, or other types of applications. Other applications 114 may also include email, texting, voice and IM applications that allow a user to send and receive emails, calls, texts, and other notifications through network 140. Where not provided by features of browser application 112, other applications 114 may include payment applications and/or include financial applications, such as banking, online payments, money transfer, or other applications associated with website server 130. Other applications 114 may contain software programs, executable by a processor, including a graphical user interface (GUI) configured to provide an interface to the user.

User device 110 may further include database 116 which may include, for example, identifiers such as operating system registry entries, cookies associated with browser application 112 and/or other applications 114, identifiers associated with hardware of user device 110, or other appropriate identifiers, such as identifiers used for payment/user/device authentication or identification. In one embodiment, identifiers in database 116 may be used by website server 130 to associate user device 110 with a particular account maintained by the website server 130. Database 116 may further include payment card information, including credit, debit, and/or gift card information. In various embodiments, database 116 may include online account access information. Information in database 116 may include a corresponding voice command or keyboard shortcut/command that may recall and enter the information based on the command. Database 116 may also store information for IVR server 120, a server corresponding to IVR server 120, and/or a wireless beacon corresponding to IVR server 120, such as identifiers, URL's and/or IP addresses, etc.

User device 110 includes at least one network interface component 118 adapted to communicate with merchant device and/or website server 130. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

IVR server 120 may be maintained, for example, by a server offering IVR services for navigation of a website, including webpages and webpage forms. Generally, IVR server 120 may be maintained by anyone or any entity that provides the IVR services described below. In this regard, IVR server 120 may include one or more processing applications, which may be configured to interact with user device 110 and/or website server 130 to generate IVR interfaces for webpages hosted by website server 130 and transmit them to user device 110 and/or website server 130 for presentation when user 102 visits the webpage using user device 110. Although IVR server 120 is shown separate from website server, some or all of the features and processes of IVR server 120 may be incorporated within website server 130.

IVR server 120 includes a webpage IVR application 122, other applications 124, a database 126, and a network interface component 128. Webpage IVR application 122 and other applications 124 may correspond to processes, procedures, and/or applications executable by a hardware processor, for example, a software program. In other embodiments, IVR server 120 may include additional or different software as required Webpage IVR application 122 may be configured to generate and provide interactive voice response (IVR) like interfaces for existing websites and webpages that do not originally provide an IVR interface. In this regard, webpage IVR application 122 may process a website and the websites corresponding webpages to provide an IVR like interface. An IVR interface for a website may provide for voice messages and/or commands that user 102 can hear. The voice messages and/or commands may correspond to webpage elements and may provide for a vocal layout of the webpage, for example, announcing the selectable tabs of a webpage, the available fields to enter information for a webpage, and/or the navigational tools of the webpage or the overarching website. In a typical webpage with forms that can be filled out, presentation logic sits on top of the fields and content. The presentation logic is connected to back-end business logic that determines how data can be entered, stored, and/or manipulated (changed, transmitted, etc.). Thus, in order to reuse existing webpage presentation logic without building a new IVR system tied to the backend business logic, webpage IVR application 122 may determine a webpage's IVR flow of existing webpage elements in a webpage and/or webpage form and define/specify IVR flow information on top of the existing webpage elements.

In order to determine the IVR flow information, existing webpage elements may be selected and an IVR flow between the existing webpage elements determined. For example, an IVR flow may correspond to assigning a first webpage element as first in the IVR flow and assigning that first webpage element a first message (including, in various embodiments, a keyboard command to select, change, and/or execute that webpage element). Similarly, the next webpage element receives a similar treatment. Once an IVR flow is determined, IVR flow information may be specified using custom HTML tags corresponding to the webpage elements. The custom HTML tags may define the IVR flow information within the webpage itself. The custom HTML tags may be included in the underlying webpage code and be interpretable by a software component library, such as a JavaScript library. In other embodiments, different scripting languages may be utilized. Thus, the software component library may be written in any browser scripting language. The custom HTML tags may include sequencing information (e.g., from the first webpage element to the next) as well as voice messages to play for each webpage element. The custom HTML tags may also include information for keys and/or keyboard commands corresponding to each webpage element so that user 102 may access, select, and/or provide information to the webpage element.

In other embodiments, the IVR flow information may be specified using a separate file/database which maintains the IVR flow information and includes links to the existing fields in the webpage. For example, a JavaScript Object Notation (JSON) file may include IVR flow information by including links to the existing webpage elements as well as voice messages to play for the webpage elements (or text to convert to voice messages) and the sequencing of the webpage elements. However, as previously discussed, other file formats may be utilized for the browser's scripting language. Thus, the file/database may be formatted in a format matching the browser scripting language utilized to generate the software component library. The file may provide for mapping between keys of a keyboard and/or keyboard commands and the webpage elements to enable a user to access, select, and/or provide information to the webpage element.

A software component library, such as a JavaScript library, may be created to interpret the custom HTML tags and/or separate file/database. The JavaScript library may be transmitted to a user's browser, such as browser application 112 of user device 110. On execution of a particular keyboard command (e.g., ctrl-I, etc.), the software component library may be loaded to interpret the IVR flow information in either the custom HTML tags or separate file/database. Thus, once user 102 engages the software component library, the software component library may be utilized to present an IVR interface to user 102 by interpreting the custom HTML tags and playing their corresponding voice messages or processing the separate file/database and playing voice messages corresponding to the linked webpage elements.

In various embodiments, IVR server 120 includes other applications 124 as may be desired in particular embodiments to provide features to IVR server 120. For example, other applications 124 may include security applications for implementing server-side security features, programmatic server applications for interfacing with appropriate application programming interfaces (APIs) over network 140, or other types of applications. Other applications 124 may contain software programs, executable by a processor, including a graphical user interface (GUI), configured to provide an interface to a user.

IVR server 120 may further include database 126 which may include, for example, identifiers such as operating system registry entries, cookies associated with webpage IVR application 122 and/or other applications 124, identifiers associated with hardware of IVR server 120, or other appropriate identifiers, such as identifiers used for device authentication or identification. Database 126 may include IVR flow information for webpages of website server 130 as well as matching software component libraries. IVR flow information and/or software component libraries may be stored in database 126 for retrieval by user device 110 or may be transmitted to website server 130 for use with webpages hosted by website server 130.

In various embodiments, IVR server 120 includes at least one network interface component 128 adapted to communicate with user device 110 and/or website server 130. In various embodiments, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Website server 130 may be maintained, for example, by an online website provider, which may provide website for display and use to user 102 through user device 110. In this regard, website server 130 includes one or more website hosting applications which may be configured to interact with user device 110 and/or IVR server 120 to provide a website and corresponding webpages to user 102 with IVR like interfaces for navigation and use of the webpages. In one example, website server 130 may be provided by PAYPAL®, Inc. of San Jose, Calif., USA. However, in other embodiments, website server 130 may be maintained by any website. Although website server 130 is shown separate from website server 130, some or all of the features and processes of website server 130 may be incorporated within IVR server 120.

Website server 130 of FIG. 1 includes a website hosting application 132, other applications 134, a database 136, and a network interface component 138. Website hosting application 132 and other application 134 may correspond to processes, procedures, and/or applications executable by a hardware processor, for example, a software program. In other embodiments, website server 130 may include additional or different software as required.

Website hosting application 132 may be configured to provide for hosting a website, including presentation of underlying webpages of the website. Website hosting application 132 may provide for webpages that are displayable to user 102 through user device 110. In this regard, user 102 may utilize user device 110 to access one or more websites of website server 130 and view the webpages of the associated domain. The webpages may correspond to Hypertext Markup Language (HTML or similar XHTML and/or CS S) documents that may be accessed and transmitted using Hypertext Transfer Protocol (HTTP) by user device 110.

In addition to providing the webpages, website hosting application 132 may provide IVR like interfaces using IVR flow information and a software component library provided by IVR server 120. When IVR information flow corresponds to custom HTML tags, website hosting application 132 may insert the custom HTML tags into a webpages HTML document. Thus, when the webpage is accessed, a software component library (e.g., JavaScript or other browser scripting language library) may be downloaded to user device 110 and engaged through a keyboard command by user 102. The software component library may then interpret the custom HTML tags in the webpages HTML document. However, where the IVR flow information is defined using a separate file/database, the separate file/database may be downloaded to user device 110 when accessing a webpage and include tags to webpage elements/fields in the file/database. A similar software component library may also be downloaded and engaged using a keyboard command. Once the file/database is interpreted by the software component library, the file/database may include keyboard keys and/or commands/shortcuts to engage webpage elements/fields.

In various embodiments, website server 130 includes other applications 134 as may be desired in particular embodiments to provide features to website server 130. For example, other applications 134 may include security applications for implementing server-side security features, programmatic server applications for interfacing with appropriate application programming interfaces (APIs) over network 140, or other types of applications. Other applications 134 may contain software programs, executable by a processor, including a graphical user interface (GUI), configured to provide an interface to a user.

Additionally, website server 130 includes database 136, which may include website data, logic, and content. Database 146 may include user accounts usable with the website of website server 130. User accounts may include user information, such as name, address, birthdate, payment/funding information, additional user financial information, and/or other desired user data. User 102 may link a user account in database 136 through a user identifier, user device identifier, and/or user account identifier. Thus, when an appropriate identifier is transmitted to website server 130, e.g. from user device 110 and/or IVR server 120, a user account belonging to user 102 may be found. However, in other embodiments, user 102 may not have previously established a user account. Thus, website server 130 may complete transactions and procedures based on other user information received from user device 110 and/or IVR server 120. Database 136 may include IVR interface information, such as IVR flow information and/or corresponding software component libraries for interpreting and presenting the IVR flow information. Information in database 136 may be utilized to present an IVR like interface for webpages of website server 130.

In various embodiments, website server 130 includes at least one network interface component 138 adapted to communicate with network 140 including user device 110 and/or IVR server 120. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
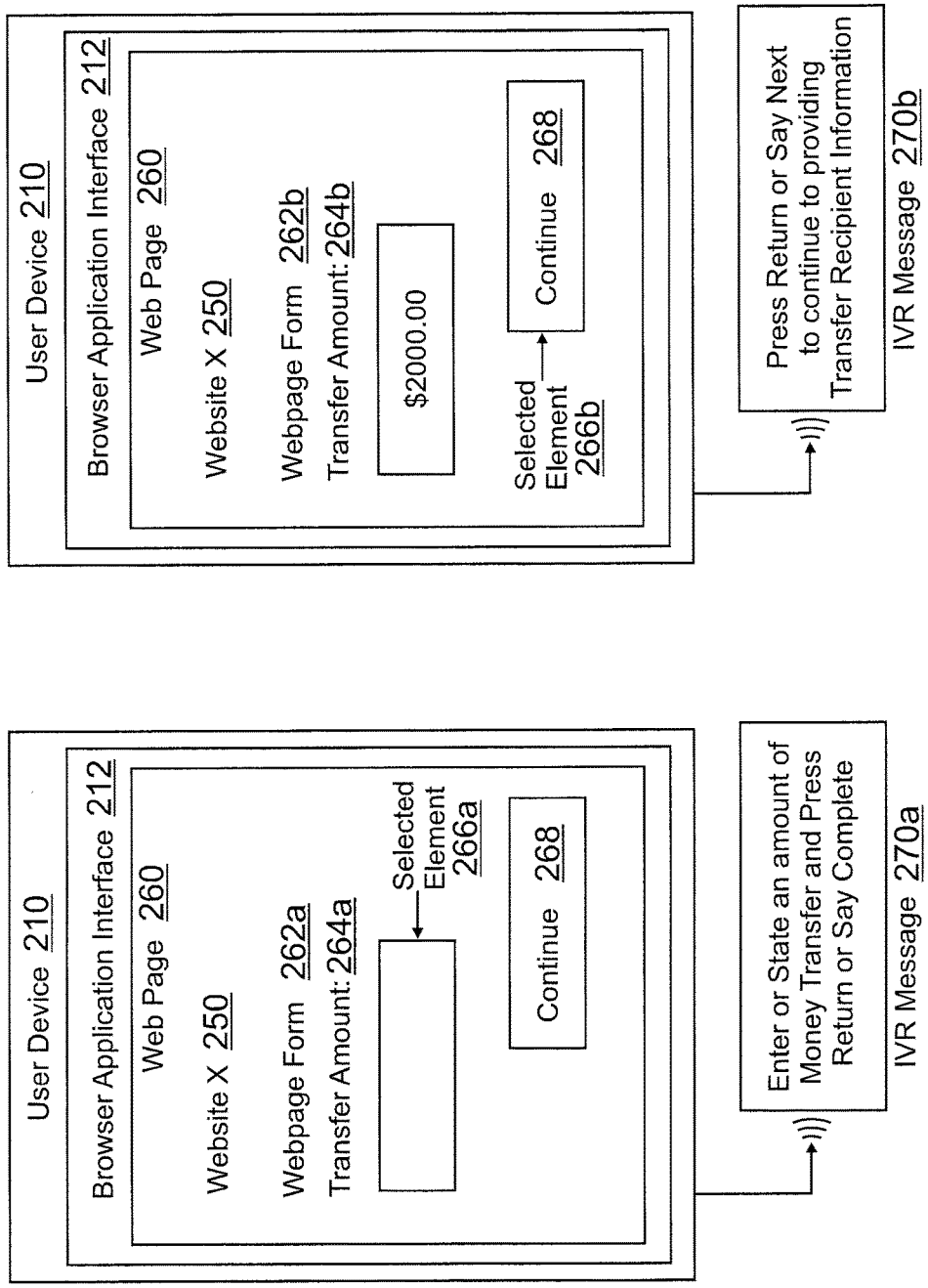
FIG. 2A is an exemplary system displaying a blank webpage form with an interactive voice response interface, according to an embodiment.
FIG. 2B is an exemplary system displaying a completed webpage form using an interactive voice response interface, according to an embodiment.

FIG. 2A is an exemplary system displaying a blank webpage form with an interactive voice response interface, according to an embodiment. FIG. 2A includes a user device 210 corresponding generally to user device 110 of FIG. 1. Additionally, user device 110 displays a browser application interface 212 corresponding generally to the described features and functions of browser application 112 of FIG. 1.

User device 210 displays browser application interface 212 having webpage 260 for website X 250. Webpage 260 may include a webpage form 262a having transfer amount 264a and a continue button 268. Additionally, webpage 260 includes a selected element 266a. As previously discussed, an IVR like interface for webpage 260 may be engaged using a keyboard command, or may be engaged using another input, such as a voice input, mouse input, etc. Once the IVR like interface is engaged through a user initiation, IVR flow information for webpage 260 may be interpreted by a software component library.

For example, the IVR flow information may correspond to custom HTML tags in the HTML document for webpage 260. Thus, a software component library, such as a JavaScript library may interpret the custom HTML tags in the webpage document that correspond to webpage elements and their corresponding voice messages. A custom HTML tag may be assigned a keyboard or voice input shortcut for selection of the webpage element. Thus, webpage form 262a may include a first custom HTML tag that is interpreted and a voice message is loaded and played that states the name of webpage form 262a, such as "Transfer Money Form." Transfer amount 264a may be a second custom HTML tags that plays a second message, shown in an IVR message 270a as "Enter or state an amount of money to transfer and press return or say complete." As shown in FIG. 2A, the custom HTML tag for transfer amount 264a may include a keyboard or voice command that enables the user viewing browser application interface 212 to complete the webpage element of transfer amount 264a. In addition, IVR message 270a or another IVR message may also state, "Press ctrl-2 to begin entering a transfer amount," in order to navigate to transfer amount 264a where the webpage element for transfer amount 264a is not immediately selected when IVR message 270a is played. Thus, IVR message 270a may include information for the user to arrive at transfer amount 264a as selected element 266a. In other embodiments, IVR message 270a includes a voice command that may allow navigation through website X 250, such as a "press backspace to return to the previous form/webpage." Webpage 260 may further include a third webpage element, continue button 268, which may be selectable with a voice command or keyboard command. Thus, IVR message 270a instructs the user to say complete or press return to complete the field of transfer amount 264a and change selected element 266a to continue button 268, as is shown in FIG. 2B.

Similar to custom HTML tags, a separate file/document, such as a JSON or other file format document corresponding to the browser scripting language, that includes the IVR flow information between webpage elements may be utilized. In a document, webpage form 262a may be tagged with links and include a message and a keyboard/voice command that may select a webpage element and/or enter information into the webpage element. In a similar manner, when the software component library loads the file/database and plays voice messages in the file/database, those webpage elements may be selected, changed, and/or processed. The voice messages and walkthrough of webpage 260 may be similar to as described above. The voice messages may include audio files or may include text messages that are translated and played. Thus, in such a way, a user may be walked through webpage 260 through voice commands.

FIG. 2B is an exemplary system displaying a completed webpage form using an interactive voice response interface, according to an embodiment. FIG. 2B includes a user device 210 corresponding generally to user device 110 of FIG. 1. Additionally, user device 110 displays a browser application interface 212 corresponding generally to the described features and functions of browser application 112 of FIG. 1.

FIG. 2B shows webpage 260 as a user navigates through webpage 260 using the IVR interface provided through IVR messages 270a of FIG. 2A and IVR message 270b in FIG. 2B. Thus, after the user hears IVR message 270a and is instructed to enter money into transfer amount 264a, the user presses return or says complete. In webpage form 262b, transfer amount 264b shows $2,000.00 after the user has stated an amount and pressed return or said complete. Thus, the IVR like interface advances selected element 266b to continue button 268 and plays IVR message 270b. IVR message 270b instructs the user to "Press return or say next to continue to providing transfer recipient information." By pressing return or saying next, the user may select continue button 268 and advance to the next webpage of website X 250.

If selection of continue button 268 causes website X 250 to advance to a new webpage, the new webpage may similarly contain IVR flow information in the form of HTML tags or a separate file/database that is interpreted by a software component library. Thus, user device 210 may continue executing the software component library, which then interprets the IVR flow information for the new webpage. The IVR flow information for the new webpage may then navigate the user through the webpage by similarly issuing voice instructions to select webpage elements and enter information into those webpage elements.

Figure 3:
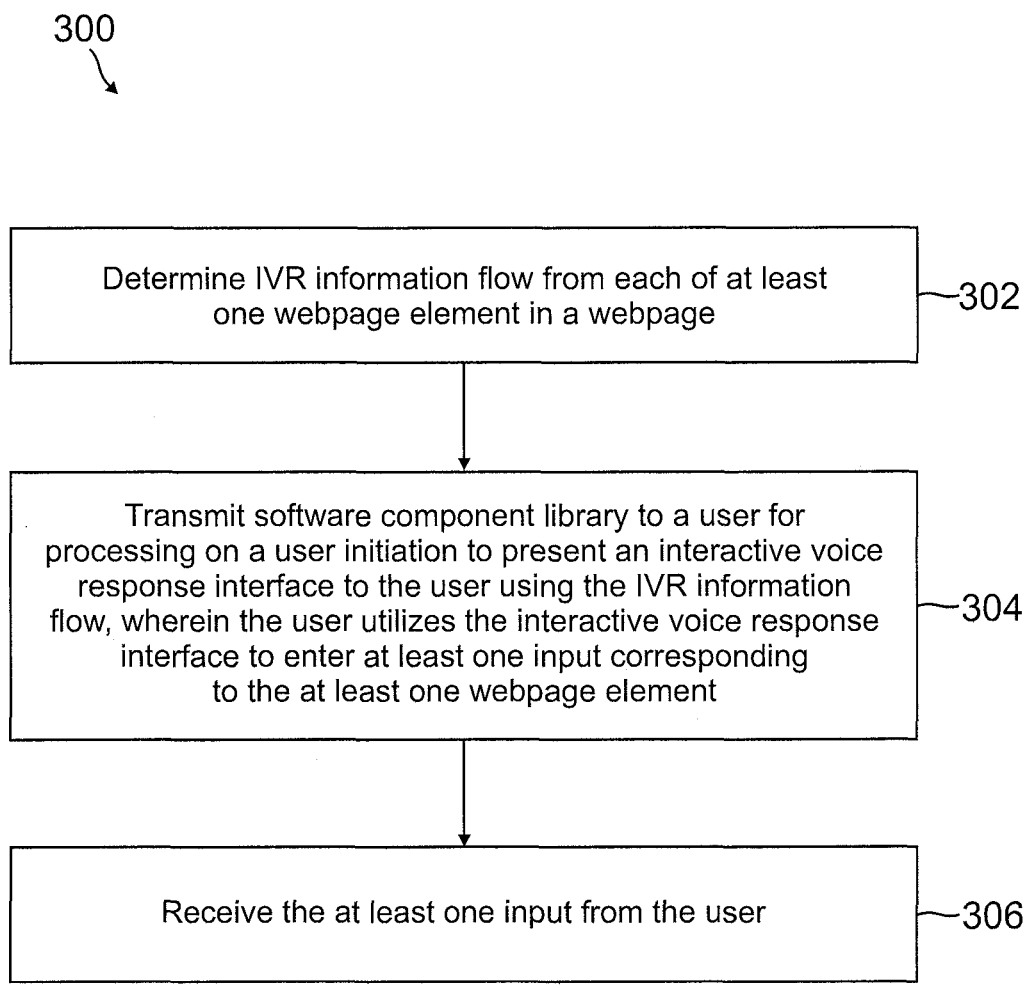
FIG. 3 is a flowchart of an exemplary process by a server for an interactive voice response interface for webpage form completion, according to an embodiment.

FIG. 3 is a flowchart of an exemplary process by a server for an interactive voice response interface for webpage form completion, according to an embodiment. Note that one or more steps, processes, and methods described herein may be omitted, performed in a different sequence, or combined as desired or appropriate.

At step 302, IVR flow information from each of at least one webpage element in a webpage is determined IVR flow information may comprise custom HTML tags corresponding to the each of the at least one webpage element. In other embodiments, IVR flow information may comprise a separate file or database with links to the each of the at least one webpage element. In various embodiments, the separate file may be a JSON file or other file format for use with a browser scripting language.

A software component library is transmitted to a user for processing on a user initiation to present an IVR interface to the user using the IVR flow information, wherein the user utilizes the IVR interface to enter at least one input corresponding to the at least one webpage element, at step 304. The software component library may interpret the IVR flow information of the webpage in order to present the each of the at least one webpage element using the IVR flow information. The IVR interface may walk the user through the webpage elements in an order and provide for keyboard and/or voice command to select webpage elements, enter information to those webpage elements, and navigate throughout the webpage including to other webpages. The software component library may comprise a JavaScript library and may be transmitted to a web browser of the user. In other embodiments, the JavaScript library may be another browser scripting language. Additionally, user initiation of the software library may comprise navigating to the webpage, a user keyboard command, and/or a user voice command.

At step 306, the at least one input is received from the user. The at least one input may comprise a text input and/or a voice input. Additionally, the at least one input may be entered into a corresponding webpage element of the at least one webpage element. The webpage may be submitted to a host of the webpage after entering the at least one input into the corresponding webpage element.

Figure 4:
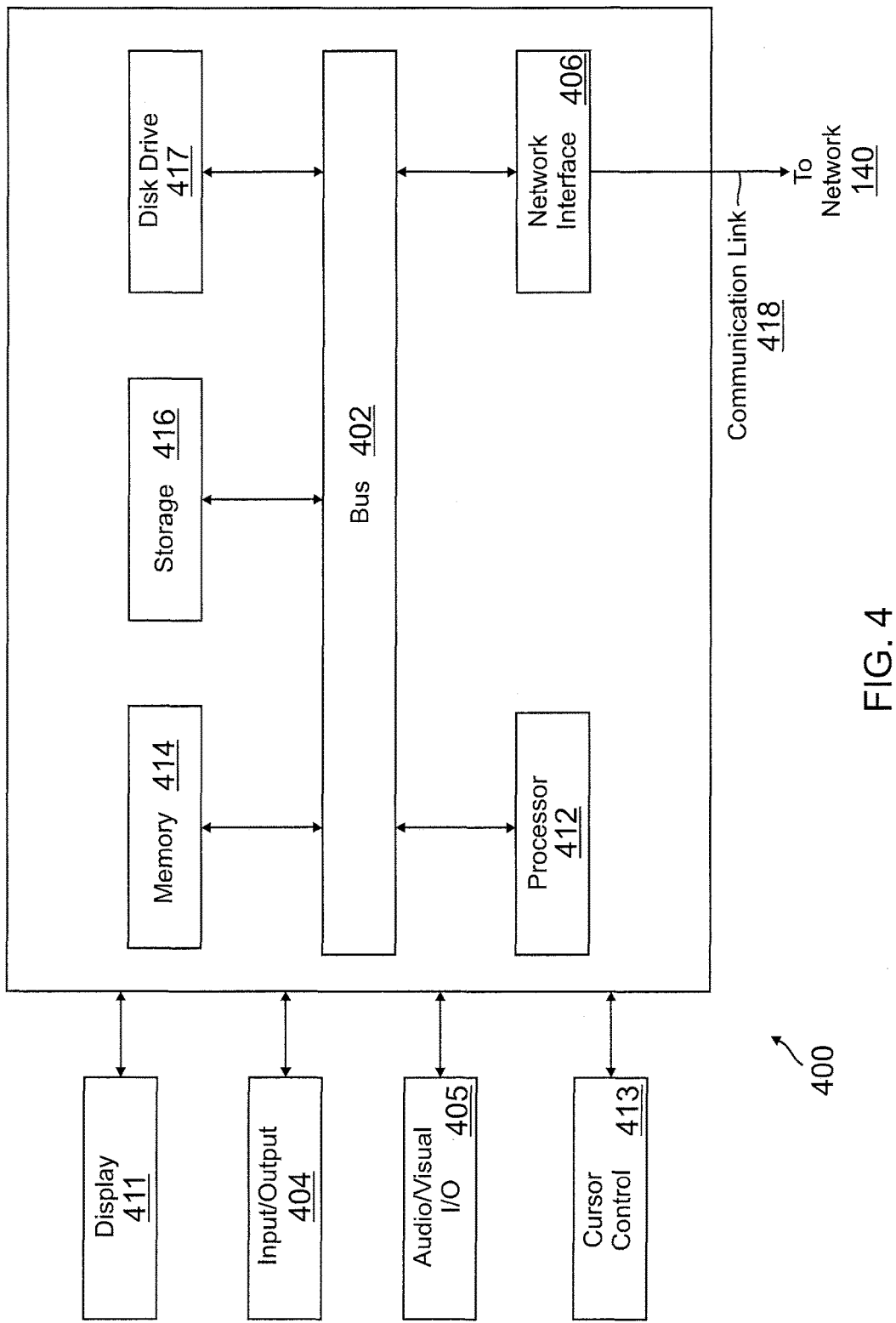
FIG. 4 is a block diagram of a computer system suitable for implementing one or more components in FIG. 1, according to an embodiment.

FIG. 4 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant device and/or service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant device, or a service provider server via network 140. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory storing a software component library for a plurality of webpage elements presented on a webpage; and
   one or more hardware processors configured to execute instructions to cause the system to perform operations comprising:
      receiving a request to access the webpage for a website from a user device, wherein the webpage comprises the plurality of webpage elements presented on the webpage;
      accessing the software component library for the webpage;
      determining hypertext markup language (HTML) tags for the plurality of webpage elements using the software component library, wherein the HTML tags include a sequencing between each of the plurality of webpage elements on the webpage using audio outputs for each of the HTML tags, and wherein the HTML tags are mapped to keyboard commands for selection of a corresponding one of the plurality of webpage elements; and
      transmitting the software component library and the HTML tags to the user device that causes the user device to present an interactive voice response (IVR) interface that enables IVR navigation between the plurality of webpage elements using audio outputs and the keyboard commands.

2. The system of claim 1, wherein the operations further comprise:
   receiving at least one input to at least one of the plurality of webpage elements, wherein the at least one input comprises one of a text input or a voice input.

3. The system of claim 2, wherein the operations further comprise:
   entering the at least one input into a corresponding webpage element.

4. The system of claim 3, wherein the operations further comprise:
   processing the at least one input into the corresponding webpage element.

5. The system of claim 1, wherein the software component library comprises a JavaScript library.

6. The system of claim 1, wherein the software component library is transmitted to a web browser of the user device.

7. The system of claim 1, wherein the operations further comprise:
   receiving a request to initiate the IVR interface, wherein the request comprises one of navigating to the webpage, one of the keyboard commands or a user voice command,
   wherein the software component library is transmitted to the user device based on the request.

8. The system of claim 1, wherein the software component library comprises a separate file or database with links to the plurality of webpage elements.

9. The system of claim 1, wherein the audio outputs further comprise an instruction for using each of the keyboard commands for the selection of the corresponding one of the plurality of webpage elements.

10. A method comprising:
    receiving a request to access a webpage for a website from a user device, wherein the webpage comprises a plurality of webpage elements presented on the webpage;
    accessing a software component library for the webpage;
    determining hypertext markup language (HTML) tags for the plurality of webpage elements using the software component library, wherein the HTML tags include a sequencing between each of the plurality of webpage elements on the webpage using audio outputs for each of the HTML tags, and wherein the HTML tags are mapped to keyboard commands for selection of a corresponding one of the plurality of webpage elements; and
    transmitting the software component library and the HTML tags to the user device that causes the user device to present an interactive voice response (IVR) interface that enables IVR navigation between the plurality of webpage elements using audio outputs and the keyboard commands.

11. The method of claim 10, further comprising:
    receiving at least one input to at least one of the plurality of webpage elements, wherein the at least one input comprises one of a text input or a voice input.

12. The method of claim 11, further comprising:
    entering the at least one input into a corresponding webpage element.

13. The method of claim 12, further comprising:
    processing the at least one input into the corresponding webpage element.

14. The method of claim 10, wherein the software component library comprises a JavaScript library.

15. The method of claim 10, wherein the software component library is transmitted to a web browser of the user device.

16. The method of claim 10, further comprising:
    receiving a request to initiate the IVR interface, wherein the request comprises one of navigating to the webpage, one of the keyboard commands or a user voice command,
    wherein the software component library is transmitted to the user device based on the request.

17. The method of claim 10, wherein the software component library comprises a separate file or database with links to the plurality of webpage elements.

18. The method of claim 10, wherein the audio outputs further comprise an instruction for using each of the keyboard commands for the selection of the corresponding one of the plurality of webpage elements.

19. A non-transitory machine-readable medium having stored thereon machine-readable instructions executable to cause a machine to perform operations comprising:
    receiving a request to access a webpage for a website from a user device, wherein the webpage comprises a plurality of webpage elements presented on the webpage;
    accessing a software component library for the webpage;
    determining hypertext markup language (HTML) tags for the plurality of webpage elements using the software component library, wherein the HTML tags include a sequencing between each of the plurality of webpage elements on the webpage using audio outputs for each of the HTML tags, and wherein the HTML tags are mapped to keyboard commands for selection of a corresponding one of the plurality of webpage elements; and
    transmitting the software component library and the HTML tags to the user device that causes the user device to present an interactive voice response (IVR) interface that enables IVR navigation between the plurality of webpage elements using audio outputs and the keyboard commands.

20. The non-transitory machine-readable medium of claim 19, wherein the audio outputs further comprise an instruction for using each of the keyboard commands for the selection of the corresponding one of the plurality of webpage elements.

* * * * *